United States Patent [19]

Gisler

[11] Patent Number: 4,619,142
[45] Date of Patent: Oct. 28, 1986

[54] EMITTED VIBRATION MEASUREMENT DEVICE AND METHOD

[75] Inventor: Gary L. Gisler, Glendale, Ariz.

[73] Assignee: The United States of America as represented by the Administrator of the National Aeronautics and Space Administration, Washington, D.C.

[21] Appl. No.: 657,310

[22] Filed: Oct. 3, 1984

[51] Int. Cl.$^4$ ............................................. G01M 1/16
[52] U.S. Cl. ...................................... 73/462; 73/473; 73/477
[58] Field of Search ................. 73/462, 471, 472, 473, 73/475, 476, 477, 593

[56] References Cited

U.S. PATENT DOCUMENTS

| | | | |
|---|---|---|---|
| 2,009,997 | 8/1935 | Germond | 73/462 |
| 2,289,074 | 7/1942 | Rushing et al. | 73/477 |
| 2,442,308 | 5/1948 | Meredith et al. | 73/471 |
| 2,651,937 | 9/1953 | Martin et al. | 73/477 |
| 2,748,603 | 6/1956 | Wilcox | 73/465 |
| 3,182,511 | 5/1965 | Federn et al. | 73/477 |
| 3,938,394 | 2/1976 | Morrow et al. | 73/462 |
| 4,040,300 | 8/1977 | Negard | 73/459 |
| 4,408,294 | 10/1983 | Iman | 73/593 |
| 4,445,373 | 5/1984 | Mueller | 73/477 |

*Primary Examiner*—Stephen A. Kreitman
*Assistant Examiner*—Scott M. Oldham

*Attorney, Agent, or Firm*—Joseph H. Beumer; John R. Manning; Leon D. Wofford, Jr.

[57] ABSTRACT

A method and apparatus for measuring vibrational forces emitted by a reaction wheel assembly during rotation of its rotor includes a low mass carriage (12) supported on a large mass base (10). The carriage (12) is in the form of an octagonal frame having an opening which is adapted for receiving the reaction wheel assembly (W) supported thereon by means of a mounting ring (22). The carriage (12) is supported on the base (10) by means of air bearings (A) which support the carriage in a generally frictionless manner when supplied with compressed air from a source (50). A plurality of carriage brackets (34) and a plurality of base blocks (30) provide for physical coupling of the base (10) and carriage (12). The sensing axes of the load cells (B) are arranged generally parallel to the base (10) and connected between the base and carriage such that all of the vibrational forces emitted by the reaction wheel assembly (W) are effectively transmitted through the sensing axes of the load cells. In this manner, a highly reliable and accurate measurement of the vibrational forces of the reaction wheel assembly can be had. The output signals from the load cells (B) are subjected to a dynamic analyzer (42) which analyzes and identifies the rotor and spin bearing components which are causing the vibrational forces.

16 Claims, 5 Drawing Figures

EMITTED VIBRATION MEASUREMENT DEVICE AND METHOD

ORIGIN OF THE INVENTION

The invention described herein was made in performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Attitude control systems are utilized on space vehicles and space platforms to maintain the attitude and orientation of the vehicle or platform in space. Typically, these attitude control systems include a plurality of reaction wheel assemblies which are arranged together in such a manner that the speeds of the wheels may be varied to produce a resultant torque which changes the attitude of the vehicle. Deviations in the attitude of the vehicle are sensed and a corresponding torque change is made in one or more of the reaction wheel assemblies to bring the vehicle back to its desired attitude and orientation in space.

As can be appreciated, in a telescope experiment, it is necessary that the telescope be oriented precisely in space. This necessitates that the attitude of the space vehicle or platform be precisely maintained in order to maintain pointing accuracy of the telescope. However, the problem occurs that disturbance forces and torques are produced by the reaction wheel assemblies due to their rotor imbalance, misalignment, bearing defects, and bearing cage instability. These forces and torques, although quite small, can cause deviations in the attitude of the vehicle or excite resonances in the spacecraft structure, resulting in jitter of the telescope mirror. A need therefore arises for testing these reaction wheel assemblies in operation to measure and correct these disturbance forces prior to launch of the vehicle.

In the past, these reaction wheel assemblies have been tested on platforms supported by means of soft flexures. A disturbance force in the reaction wheel results in motion of the platform on its flexures. The acceleration due to this motion is measured by accelerometers mounted on the platform. The accelerations are converted to forces by multiplying the accelerometer output by the mass of the body on the flexures. These measuring devices must be designed to measure forces emitted from a rotating assembly to levels as low as 0.0002 pounds since these vibrational operating forces are usually of minute proportions. However, the forces are of a sufficiently significant proportion to change the attitude of a vehicle in space.

The problem has occured in the prior testing devices that due to system dynamics, the masses of the elements being accelerated are not known accurately which causes difficulty in calculation of the forces from the accelerometer readings. Furthermore, the mounting of the test platform on soft flexure members such as spring biased cantilevered arms has not provided sufficient isolation to allow measurement of forces to as low a level as necessary. Even where load cells are utilized, it is not possible to determine what percentage of the emitted forces are transmitted through the load cell or through the flexure mount.

Accordingly, an important object of the present invention is to provide a device for measuring the emitted vibrational forces produced by a reaction wheel assembly due to rotor imbalances, misalignment, bearing defects, cage instability and other minor elements. By accurately measuring these vibrational forces, the source of these forces can be determined and corrected in the wheel assembly.

Still another important object of the present invention is to provide an emitted rotation force measuring device and method in which these forces are more accurately channeled through a sensing axis of a sensing device to provide a more accurate reading of the forces and identification of their source components.

Still another important object of the present invention is to provide an emitted vibrational force measuring device and method in which a mounting carriage for a reaction wheel assembly is supported on generally frictionless air bearings and attached to a base plate by means of piezoelectric load cells so that all of the vibrational forces emitted by the reaction wheel assembly are transmitted through the sensing axes of the load cells.

SUMMARY OF THE INVENTION

The above objectives are accomplished according to the present invention by providing a low-mass carriage on which a reaction wheel assembly is supported. The carriage itself is supported on a large-mass base by means of air bearings. Connection between the carriage and the base plate is made by piezoelectric load cells so that the vibrational forces emitted by the rotor and bearing components of rotating wheel assembly can be transmitted only through the load cells. The load cells are connected to a summing amplifier which amplifies the load cell signals. The output of the summing amplifier is fed to a dynamic analyzer which performs a frequency analysis on the output signal to separate the force frequencies of the emitted vibrations. From this frequency spectrum analysis, the forces and component causing the forces are determined such as bearing misalignment, wheel imbalance, bearing race defects, bearing ball defects, and bearing cage forces. This information is used to select components which minimize or eliminate the emitted vibrational force.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
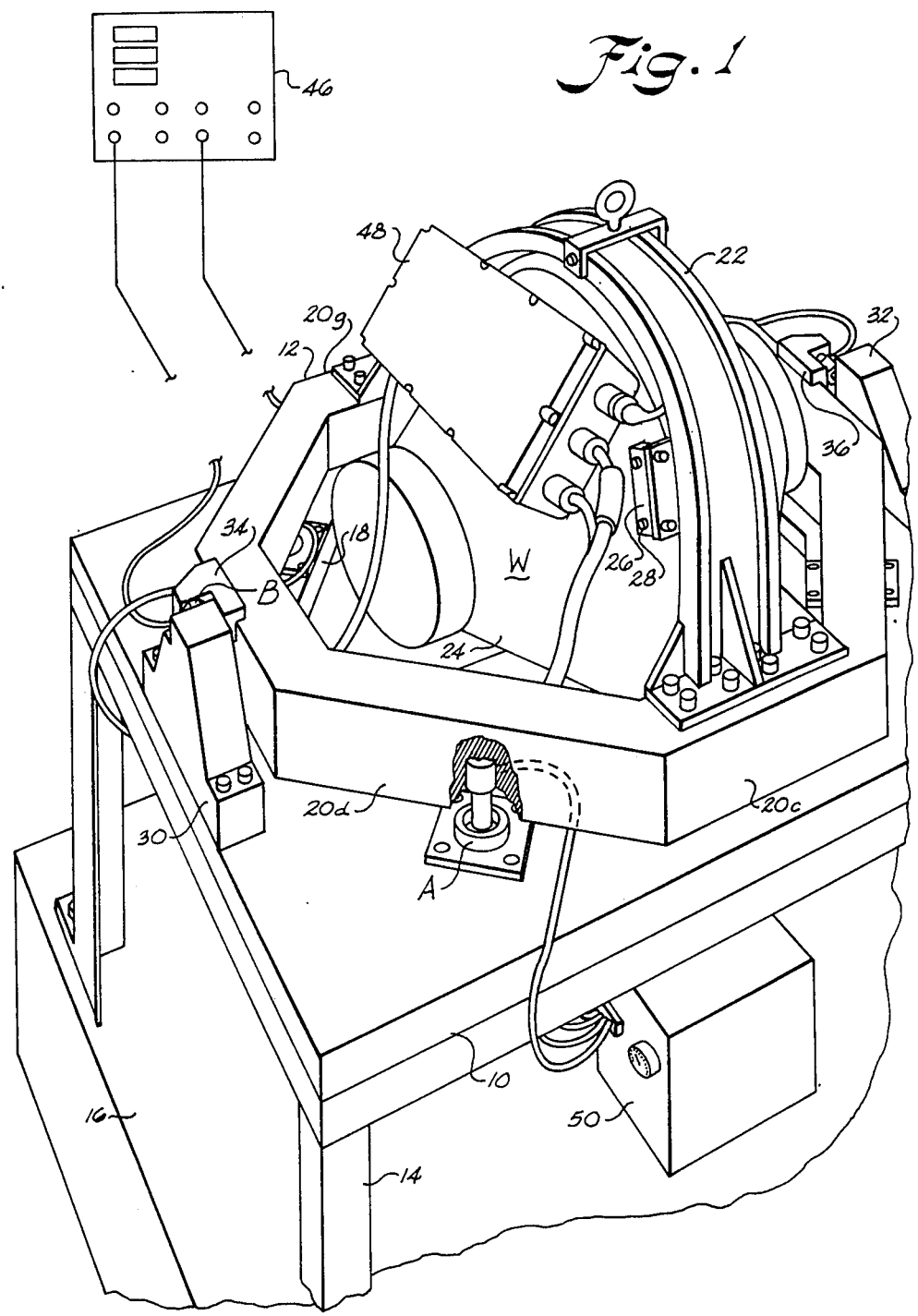
FIG. 1 is a perspective view illustrating the device and method of the present invention for measuring vibrational forces emitted from a reaction wheel assembly.
Figure 2:
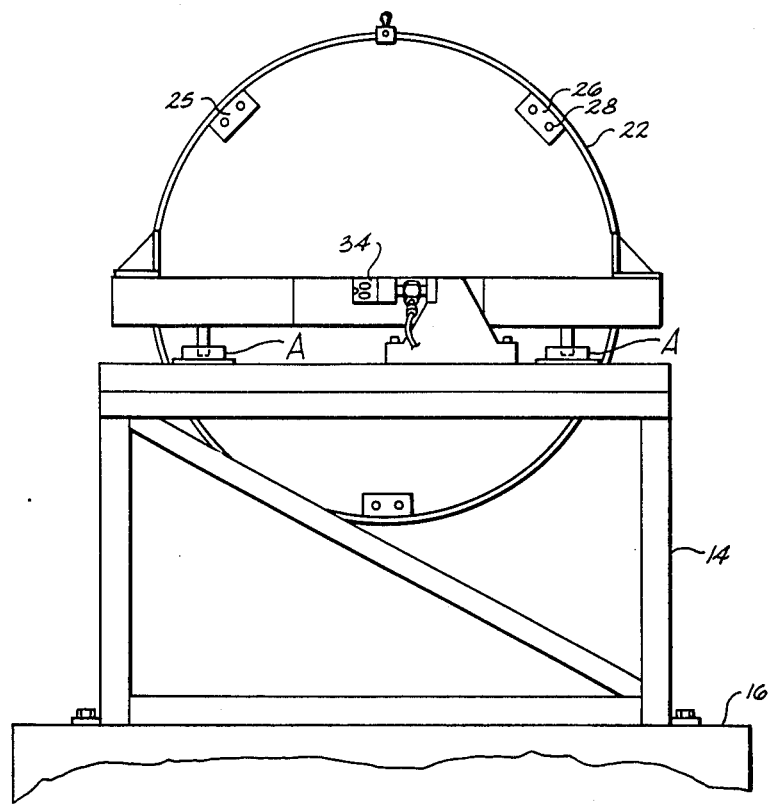
FIG. 2 is a side elevation illustrating a device and method for measuring vibrational forces emitted from a reaction wheel assembly.

Referring now in more detail to the drawings, a device and method for measuring vibrational forces emitted from a reaction wheel assembly W are illustrated in FIGS. 1 and 2 as including a large mass base 10 and a low mass carriage 12 which is supported vertically on the base 10 by means of virtually frictionless supports in the horizontal direction. The base 10 is carried on a frame 14 which is supported on an isolation pad 16 consisting of a 10,000 pound concrete block supported on flexure members (not shown) such as rubber bladders to completely isolate the measurement device from vibrational forces imparted from the surrounding environment.

Figure 3:
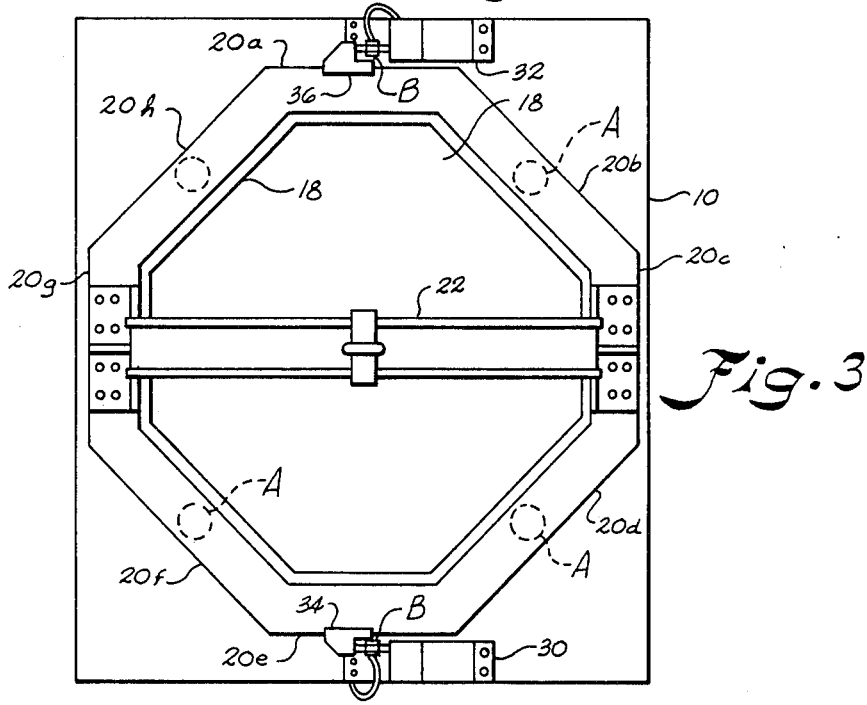
FIG. 3 is a top plan view of the device of FIG. 2.

The base 10 and carriage may be constructed from any suitable material such as machined aluminum. The base 10 includes a solid plate of aluminum. The base plate has an octagonal shaped opening 18 (FIG. 3) for accommodating the reaction wheel assembly when installed. The carriage includes an octagonal frame 20 constructed of aluminum and having a correspondingly shaped opening. A mounting ring 22 is carried between opposing sides 20c and 20g of the carriage for attaching a reaction wheel assembly 24 to the carriage. This is done by any suitable means such as brackets 25, 26 mounting the reaction wheel assembly directly to the mounting ring by machine screws 28.

Supporting the carriage 12 on the base 10 are four air bearings A. These air bearings are connected to sides 20b, 20d, 20f, and 20h of the carriage by any suitable means. Any suitable air bearings may be utilized to provide a virtually frictionless support for the carriage on the base. Suitable air bearings are manufactured by the Dextair Air Bearing Co. of New Jersey.

Figure 5:
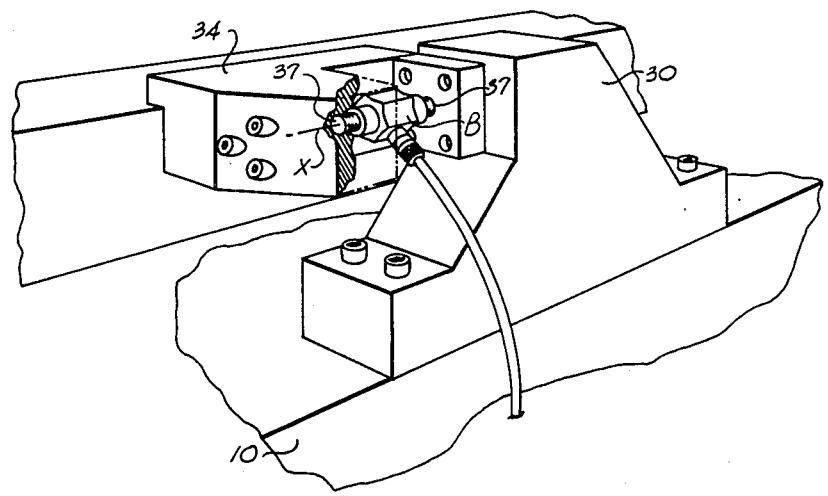
FIG. 5 is a partial perspective view of a piezoelectric load cell connection between a low-mass carriage and large-mass base according to the invention.

A pair of base blocks 30 and 32 are carried on the base 10. A pair of carriage brackets 34 and 36 are carried by the carriage 12. As shown in FIG. 5, a load cell B is carried between the base block 30 and carriage bracket 34 and between the base block 32 and carriage bracket 36. Threaded studs 37 along the sensing axis of the load cell connect the load cell to the bracket and block of each mount. The load cell is a piezoelectric load cell such as that manufactured by the Kistler Corp. as Model 922F1.

The sensing axis of the load cell is parallel to the base and perpendicular to the vertical axes on which the carriage and reaction wheel assembly are frictionlessly supported. The carriage is connected to the base only through the load cell connections. The only way the vibrational forces emitted from the rotating wheel assembly can be transmitted to the base is through the load cells.

Figure 4:
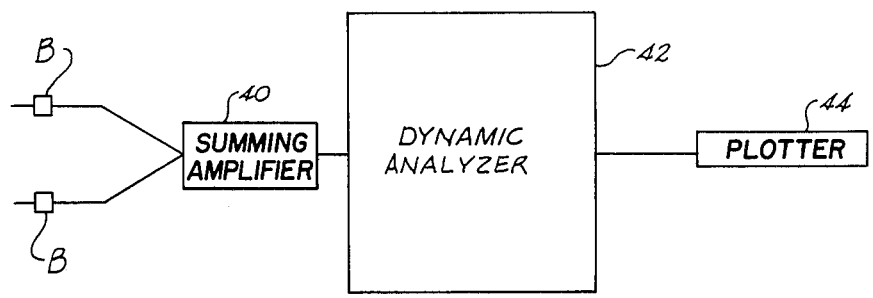
FIG. 4 is a block diagram of a circuit for analyzing the forces sensed by a measuring device and method according to the present invention and breaking these signals down into component forces.

Referring now to the block diagram of FIG. 4, the piezoelectric load cells B are connected to a conventional low-noise summing amplifier 40 which adds the two signals coming from the force transducers and also takes the difference of the two signals. The two signals are added and amplified by a factor of five. The difference between the two signals is calculated as the moment of the wheel assembly to give an indication of emitted torques from the wheel assembly other than about the axis of rotation. The output of the summing amplifier 40 is fed to a dynamic analyzer 42 which analyzes the amplified output signal to determine which frequencies contribute to the overall emitted vibrations. A suitable dynamic analyzer is a Model 5423A manufactured by the Hewlett Packet Corp. The spectrum analyzer breaks the forces signals down into their frequencies components in the range of 0 to 100 Hertz and plots the resulting signals on a plotter 44. From this frequency analysis it is possible to break up the forces into their source components as coming from wheel imbalance, wheel and bearing misalignments, bearing race defects (inner and outer races), bearing ball defects, and bearing cage forces. By identifying the forces as being attributable to these inaccuracies and defects, the various components causing the various vibrational forces can be corrected or selected to minimize the resulting deviations in vehicle attitude.

An electronic drive box 46 connects to a control box 48 which controls an electric drive motor inside of the reaction wheel assembly which drives the rotor of the reaction wheel assembly W during testing and subsequent operation.

The method according to the present invention of testing the reaction wheel assembly to eliminate any vibrational forces includes mounting the reaction wheel assembly W on the carriage 12 and supporting the carriage on a large mass base 10 by means of air bearings A which support the carriage along vertical axes. The carriage and base are physically coupled together by means of piezoelectric load cells B having their sensing axes arranged in a plane generally parallel to the base and perpendicular to the vertical axes on which the carriage is frictionlessly supported. Next the rotor of the assembly is rotated by means of the electric rotor drive 46 of the reaction wheel assembly causing vibrational forces to be emitted due to imbalances and imperfections existing in the rotor components and spin bearing components and producing the resultant output signals in the load cells. The output signals from the load cells are analyzed to determine the specific components of the rotor and spin bearings which are producing the emitted vibrational forces. By this method, all of the vibrational forces emitted by the reaction wheel assembly during testing are caused to go through the sensing axes of the piezoelectric load cells when the carriage and reaction wheel assembly are supported on the air bearings in a generally frictionless manner.

Thus, it can be seen that a highly advantageous construction and method for testing a reaction wheel assembly is provided by the instant invention in which a low mass carriage is supported by air bearings on a large mass base in a virtually frictionless manner. The frictional forces emitted by the rotor of the reaction wheel assembly are effectively channeled and transmitted through piezoelectric load cells. The signals are fed to a summing amplifier. A frequency analysis is done on the amplifier output and the frequency of the emitted vibrations is determined. From this it is possible to identify the components of the reaction wheel assembly causing the vibrational forces. The information can be used to select the components of the assembly to minimize or eliminate the vibrational forces from the reaction wheel during use in space.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A method for measuring the vibrational forces produced by a reaction wheel assembly due to the rotor and bearing components and their imbalance and imperfections comprising:

providing a large mass base;

providing a low mass carriage adapted for carrying said reaction wheel assembly out of contact with said base;

supporting said carriage on said base by means of air bearing supports at locations spaced about said carriage to provide a generally frictionless support of said carriage on said base along vertical axes;

connecting said carriage and base together by means of load cells at location different from said location of said air bearing supports having a sensing axis in a plane generally parallel to said base so that the only physical coupling between said carriage and base is through said load cells; and analyzing the signals produced by said load cells to identify the rotor components and bearing components causing the vibrational forces.

2. The method of claim 1 wherein said load cells are provided by piezoelectric load cells.

3. The method of claim 1 including mounting said base on an isolation pad to effectively remove the base and carriage from outside vibrations.

4. A method for accurately measuring the vibrational forces produced by a reaction wheel assembly due to the rotor and bearing components comprising:

mounting said reaction wheel assembly on a low mass carriage;

supporting said carriage on a large mass base by means of air bearings along vertical axes;

physically coupling said carriage and base together by means of piezoelectric load cells having their sensing axes arranged in a plane generally parallel to said base;

rotating said rotor to cause vibrational forces to be emitted by any imbalances and imperfections in said rotor components and bearing components and to produce output signals in said load cells; and analyzing said output signals from said load cells to determine the components which cause said forces.

5. The method of claim 4 including feeding the output signal from said load cell transducers to a summing amplifier;

taking the sum and differences of said output signals from said force transducers and amplifying said sums and differences;

delivering the output of said summing amplifier to a dynamic analyzer to determine the frequency of the emitted vibrational forces and separating said frequencies to correspond to the forces caused by the rotor and bearing components.

6. The method of claim 4 including supporting said base on an isolation pad which effectively isolates said carriage and base from outside vibrational influences.

7. A device for accurately measuring the vibrational forces emitted by a reaction wheel assembly having a rotor and spin bearings due to the imbalances and misalignments in the rotor and inaccuracies and imperfections in the spin bearings, said device comprising:

a base means;

a plurality of upstanding base blocks carried by said base means being spaced apart in an opposed relation with respect to each other;

a carriage adapted for carrying said reaction wheel assembly having a relatively lower mass than said base means;

a plurality of carriage bracket means carried by said carriage spaced about said carriage for connection with respective ones of said base blocks;

a plurality of air bearing supports supporting said carriage on said base in a generally frictionless manner along vertical axes;

a plurality of piezoelectric load cells physically coupling said base blocks and said brackets;

said piezoelectric load cells having their sensing axis lying in a plane generally parallel to said base and perpendicular to said vertical axes along which said carriage is supported on said base;

said physical coupling of said piezoelectric load cells between said base means and said carriage providing the sole physical coupling between said base means and said carriage when said carriage is frictionlessly supported along said vertical axes on said base means and, said sensing axis of said load cells being disposed in opposing relationship and perpendicular to a rotor axis of said rotor; and means for driving said rotor of said reaction wheel assembly to cause vibrational forces to be emitted from said reaction wheel assembly due to any rotor imbalances and misalignments and any bearing inaccuracies and imperfections;

whereby said vibrational forces emitted from said reaction wheel assembly are transmitted from said carriage to said base only through said sensing axes of said piezoelectric load cell.

8. The device of claim 7 wherein said carriage includes a multi-sided frame having an opening for accommodating said reaction wheel assembly carried by said carriage.

9. The device of claim 8 including a mounting ring extending over and bridging a pair of opposing sides of said carriage which is adapted for connection to said reaction wheel assembly.

10. The device of claim 9 wherein said base means includes a shaped opening which is contoured to accommodate said reaction wheel assembly when carried by said carriage and said carriage is supported by means of said air bearing supports on said base.

11. The device of claim 7 including circuit means for analyzing said output signals from said piezoelectric load cells to identify the components of said rotor and spin bearings causing said vibrational forces.

12. The device of claim 11 wherein said circuit means includes:

a summing amplifier for amplifying said output signals from said piezoelectric load cells to produce an amplified output signal;

analyzer means for analyzing said amplified output signal and identify the components which are producing said vibrational forces emitted from said reaction wheel assembly.

13. The device of claim 7 including an isolation pad on which said base is supported for isolating said base and carriage from outside vibrational influences.

14. The device of claim 8 wherein said carriage is octagonal shaped.

15. A device for accurately measuring vibrational forces comprising:

a base means;

a plurality of upstanding base blocks carried by said base means, said base blocks being spaced apart in an opposed relation with respect to each other;

a carriage adapted to carry a member producing vibrational forces;

a plurality of carriage bracket means carried by said carriage at first locations, said bracket means spaced about said carriage for connection with respective ones of said base blocks;

a plurality of air bearing supports supporting said carrige or said base means in a generally frictionless manner along vertical axes, said air bearing supports being disposed at spaced locations about said carriage different from said first locations;

a plurality of piezoelectric load cells, each said load cell coupling a said base block to a said bracket means; and said piezoelectric load cells having their sensing axis lying in a plane generally parallel to said base means and perpendicular to said vertical axes along which said carriage is supported on said base means.

16. A device according to claim 14 including:

circuit means for analyzing output signals for said piezoelectric load cells to identify the vibrational forces of the member carried by said carriage.